US009798514B2

(12) United States Patent
Silva et al.

(10) Patent No.: US 9,798,514 B2
(45) Date of Patent: Oct. 24, 2017

(54) SYSTEM AND METHOD FOR COLOR BEAT DISPLAY IN A MEDIA CONTENT ENVIRONMENT

(71) Applicant: SPOTIFY AB, Stockholm (SE)

(72) Inventors: Ivo Silva, Stockholm (SE); Joe Phillips, Stockholm (SE); Stanley Wood, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/065,735

(22) Filed: Mar. 9, 2016

(65) Prior Publication Data

US 2017/0262253 A1 Sep. 14, 2017

(51) Int. Cl.
*G06F 3/16* (2006.01)
*G06F 3/0484* (2013.01)
(Continued)

(52) U.S. Cl.
CPC ............ *G06F 3/165* (2013.01); *G06F 3/0482* (2013.01); *G06F 3/04842* (2013.01);
(Continued)

(58) Field of Classification Search
CPC ................. G06F 3/04847; G06F 3/165; G06F 17/30775; G06F 2206/20; G06F 3/16; G09G 5/30
See application file for complete search history.

(56) References Cited

U.S. PATENT DOCUMENTS 6,005,563 A 12/1999 White et al.
6,654,367 B1 11/2003 Kaufman
(Continued)

FOREIGN PATENT DOCUMENTS

EP 2045704 A2 4/2009
EP 2226715 A2 9/2010
(Continued)

OTHER PUBLICATIONS

Summons to attend oral proceedings pursuant to Rule 115(1) EPC issued on European patent application No. 14162386.8, dated Nov. 25, 2015, 12 pages.
(Continued)

*Primary Examiner* — Amy M Levy
(74) *Attorney, Agent, or Firm* — Tucker Ellis LLP

(57) ABSTRACT

In accordance with an embodiment, described herein is a system and method for color beat display in a media content environment. A media device, operating as a client device, can receive and play media content provided by a media server, or another system or peer device. A user interface enables a user to select from a plurality of displayed media options to be played at the device, wherein each media option corresponds to a media content item, e.g., a song. During the playing of a selected media content, a visual display logic or component determines an audio beat, volume, or other characteristic of the playing media content, and uses this information to modify the visual display at the user interface, to match the audio beat, volume, or other characteristic, for example by synchronizing a variation in color, brightness, scale, transparency, or intensity of a particular region of the visual display.

16 Claims, 9 Drawing Sheets

(51) Int. Cl.
*G06F 3/0482* (2013.01)
*G09G 5/12* (2006.01)
*G09G 5/10* (2006.01)
*G09G 5/373* (2006.01)
*G09G 5/02* (2006.01)

(52) U.S. Cl.
CPC ........... *G06F 3/04845* (2013.01); *G09G 5/02* (2013.01); *G09G 5/10* (2013.01); *G09G 5/12* (2013.01); *G09G 5/373* (2013.01); *G09G 2320/0626* (2013.01); *G09G 2320/0666* (2013.01)

(56) References Cited

U.S. PATENT DOCUMENTS

| | | |
|---|---|---|
| 7,571,014 B1 | 8/2009 | Lambourne et al. |
| 9,423,998 B2 | 8/2016 | Dziuk |
| 9,449,109 B1* | 9/2016 | Keel ............... G06F 17/3087 |
| 2001/0030660 A1 | 10/2001 | Zainoulline |
| 2002/0103919 A1 | 8/2002 | Hannaway |
| 2002/0120752 A1 | 8/2002 | Logan et al. |
| 2003/0126605 A1 | 7/2003 | Betz et al. |
| 2004/0056885 A1 | 3/2004 | Azami et al. |
| 2004/0268413 A1 | 12/2004 | Reid |
| 2005/0275626 A1* | 12/2005 | Mueller ............... H05B 37/029 345/156 |
| 2006/0152622 A1* | 7/2006 | Tan ........................ G10H 1/368 348/473 |
| 2006/0259877 A1 | 11/2006 | Kaminagayoshi |
| 2006/0265349 A1 | 11/2006 | Hicken |
| 2007/0130159 A1 | 6/2007 | Gulli et al. |
| 2007/0180979 A1* | 8/2007 | Rosenberg ........... G02B 27/017 84/611 |
| 2007/0192739 A1 | 8/2007 | Hunleth et al. |
| 2008/0026690 A1* | 1/2008 | Foxenland ............ G10H 1/368 455/3.06 |
| 2008/0086687 A1 | 4/2008 | Sakai et al. |
| 2008/0255688 A1* | 10/2008 | Castel ................... H04N 7/163 700/94 |
| 2009/0019398 A1 | 1/2009 | Hansson et al. |
| 2009/0046545 A1 | 2/2009 | Blinnikka |
| 2009/0158198 A1 | 6/2009 | Hayter et al. |
| 2009/0193465 A1 | 7/2009 | Yi |
| 2010/0053192 A1* | 3/2010 | Miyazaki ............. G10H 1/0008 345/589 |
| 2010/0229094 A1 | 9/2010 | Nakajima et al. |
| 2010/0262938 A1 | 10/2010 | Woods |
| 2010/0302445 A1 | 12/2010 | Kunihara |
| 2011/0035705 A1 | 2/2011 | Faenger et al. |
| 2011/0234480 A1 | 9/2011 | Fino et al. |
| 2012/0015729 A1* | 1/2012 | Takehiro .................. A63F 13/10 463/35 |
| 2012/0042007 A1 | 2/2012 | Weel |
| 2012/0078398 A1 | 3/2012 | Xu et al. |
| 2012/0173981 A1 | 7/2012 | Day |
| 2012/0311444 A1 | 12/2012 | Chaudhri |
| 2013/0047084 A1 | 2/2013 | Sanders et al. |
| 2013/0067328 A1 | 3/2013 | Salyards et al. |
| 2013/0113737 A1 | 5/2013 | Shiba |
| 2013/0178962 A1 | 7/2013 | DiMaria et al. |
| 2014/0035831 A1 | 2/2014 | Fino |
| 2014/0108929 A1* | 4/2014 | Garmark ................. H04L 65/60 715/716 |
| 2014/0115114 A1* | 4/2014 | Garmark ................. H04L 65/60 709/219 |
| 2014/0122589 A1 | 5/2014 | Fyke et al. |
| 2014/0123006 A1 | 5/2014 | Chen et al. |
| 2014/0181199 A1 | 6/2014 | Kumar et al. |
| 2014/0181656 A1 | 6/2014 | Kumar et al. |
| 2014/0215334 A1* | 7/2014 | Garmark ................. H04L 65/60 715/716 |
| 2014/0223303 A1 | 8/2014 | Cox et al. |
| 2014/0304756 A1 | 10/2014 | Fletcher |
| 2014/0306976 A1 | 10/2014 | Sugiura et al. |
| 2014/0325357 A1 | 10/2014 | Sant et al. |
| 2014/0331133 A1 | 11/2014 | Coburn, IV et al. |
| 2015/0002046 A1* | 1/2015 | Schlangen .......... H05B 37/0236 315/291 |
| 2015/0205864 A1 | 7/2015 | Fuzell-Casey et al. |
| 2015/0234564 A1* | 8/2015 | Snibbe .................. G06F 3/0488 715/716 |
| 2015/0334204 A1 | 11/2015 | Bilinski et al. |
| 2016/0035323 A1* | 2/2016 | Na ............................ G09G 5/30 715/716 |
| 2016/0054916 A1* | 2/2016 | Snibbe .................. G06F 3/0488 715/726 |
| 2016/0103589 A1 | 4/2016 | Dziuk |
| 2016/0103595 A1 | 4/2016 | Dziuk et al. |
| 2016/0103656 A1 | 4/2016 | Dziuk |

FOREIGN PATENT DOCUMENTS

| | | |
|---|---|---|
| EP | 2320335 A2 | 5/2011 |
| EP | 2434491 A1 | 3/2012 |
| EP | 2925008 A1 | 9/2015 |
| EP | 3059973 A1 | 8/2016 |
| WO | WO2015/154515 A1 | 10/2015 |

OTHER PUBLICATIONS

Office Action from the United States Patent and Trademark Office for U.S. Appl. No. 14/231,203, dated Sep. 17, 2015, 16 pages.
European Patent Office, Extended Search Report for European Patent Application No. EP14162386.8, dated Aug. 25, 2014, 7 pages.
Office Action from the United States Patent and Trademark Office for U.S. Appl. No. 14/053,443, dated Apr. 27, 2015, 11 pages.
Office Action from the United States Patent and Trademark Office for U.S. Appl. No. 14/231,203, dated Jun. 18, 2014, 12 pages.
Office Action from the United States Patent and Trademark Office for U.S. Appl. No. 14/231,203, dated Oct. 28, 2014, 15 pages.
Office Action from the United States Patent and Trademark Office for U.S. Appl. No. 14/231,203, dated May 13, 2015, 16 pages.
Office Action from the United States Patent and Trademark Office for U.S. Appl. No. 14/060,495, dated Jul. 27, 2015, 18 pages.
International Preliminary Report on Patentability issued on international application No. PCT/IB2013/002808 on Apr. 14, 2015, 16 pages.
Office Action from the United States Patent and Trademark Office for U.S. Appl. No. 14/231,170, dated Jun. 26, 2014, 22 pages.
Office Action from the United States Patent and Trademark Office for U.S. Appl. No. 14/231,170, dated Oct. 28, 2014, 28 pages.
Office Action from the United States Patent and Trademark Office for U.S. Appl. No. 14/231,170, dated May 7, 2015, 29 pages.
Office Action from the United States Patent and Trademark Office for U.S. Appl. No. 14/879,743, dated Mar. 1, 2016, 8 pages.
Office Action from the United States Patent and Trademark Office for U.S. Appl. No. 14/879,774, dated Feb. 8, 2016, 11 pages.
European Patent Office, Extended Search Report for European Patent Application No. EP16161961.4, dated Jun. 15, 2016, 10 pages.
Notice of Allowance from the United States Patent and Trademark Office for U.S. Appl. No. 14/879,737, dated Apr. 12, 2016, 9 pages.
Office Action from the United States Patent and Trademark Office for U.S. Appl. No. 14/228,605, dated Apr. 26, 2016, 10 pages.
Notice of Allowance from the United States Patent and Trademark Office for U.S. Appl. No. 14/879,743, dated Jun. 20, 2016, 8 pages.
Notice of Allowance from the United States Patent and Trademark Office for U.S. Appl. No. 14/879,774, dated Jul. 6, 2016, 7 pages.
"Samsung Introduces Milk Music, the Next Big Thing in Music", https://news.samsung.com/global/samsung-introduces-milk-music-the-next-big-thing-in-music, 4 pages, published on Mar. 8, 2014. (Downloaded on Sep. 26, 2016.).
"Samsung Milk Music Design Story—Unexpected Music Discovery", http://www.design.samsung.com/global/contents/milk_music/, 3 pages, published Mar. 2014. (Downloaded on Sep. 26, 2016.).

(56) References Cited

OTHER PUBLICATIONS

The Verge, "Samsung takes another crack at streaming radio with Milk", http://www.theverge.com/2014/3/7/5481482/samsung-takes-another-crack-at-streaming-radio-with-milk, 18 pages, published on Mar. 7, 2014. (Downloaded on Sep. 26, 2016.).
CNET, "Hands on with Samsung's Milk Music", http://www.cnet.com/products/milk-android/preview/, 5 pages, published on Mar. 6, 2014. (Downloaded on Sep. 26, 2016).
Android Static, "Milk Music: A New Ad-Free Streaming Music App from Samsung", http://www.androidstatic.com/milk-music-new-ad-free-streaming-music-app-samsung/, 5 pages, published on Mar. 7, 2014. (Downloaded on Sep. 26, 2016.).
Android Police, "Hands-on With Samsung Milk: Music Made Refreshingly Simple . . . And Creamy", http://www.androidpolice.com/2014/03/07/hands-on-with-samsung-milk-music-made-refreshingly-simple-and-creamy-video/, 6 pages, published on Mar. 7, 2014. (Downloaded on Sep. 26, 2016.).
Office Action from the United States Patent and Trademark Office for U.S. Appl. No. 14/228,605, dated Nov. 25, 2016, 10 pages.
European Patent Office, Extended Search Report for European Patent Application No. EP16199679.8, dated Feb. 13, 2017, 13 pages.
International Search Report and Written Opinion issued by International Searching Authority for International Application No. PCT/EP2017/055369, mailed Apr. 24, 2017 (15 pages).
"User interface—How does the algorithm to color the song list in iTunes 11 work?—Stack Overflow", http://stackoverflow.com/questions/13637892/how-does-the-algorithm-to-color-the-song-list-in-itunes-11-work?answertab=oldest#tab-top, edited May 10, 2013, 6 pages. (Retrieved on Apr. 11, 2017.).

* cited by examiner

SYSTEM AND METHOD FOR COLOR BEAT DISPLAY IN A MEDIA CONTENT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to the providing of media content, or other types of data, and are particularly related to a system and method for color beat display in a media content environment.

BACKGROUND

Today's consumers enjoy the ability to access a tremendous amount of media content, such as music and videos, at any location or time of day, using a wide variety of media devices.

However, with the increase in the amount of media content available, there exists the challenge of how to provide users with a means of accessing content in an efficient and user-friendly manner, and one that improves the user interaction experience. These are some examples of the types of environments in which embodiments of the invention can be used.

SUMMARY

In accordance with an embodiment, described herein is a system and method for color beat display in a media content environment. A media device, operating as a client device, can receive and play media content provided by a media server, or another system or peer device. A user interface enables a user to select from a plurality of displayed media options to be played at the device, wherein each media option corresponds to a media content item, e.g., a song. During the playing of a selected media content, a visual display logic or component determines an audio beat, volume, or other characteristic of the playing media content, and uses this information to modify the visual display at the user interface, to match the audio beat, volume, or other characteristic, for example by synchronizing a variation in color, brightness, scale, transparency, or intensity of a particular region of the visual display.

DETAILED DESCRIPTION

As described above, with the increase in the amount of media content available, there exists the challenge of how to provide users with a means of accessing content in an efficient and user-friendly manner, and one that improves the user interaction experience.

In accordance with an embodiment, described herein is a system and method for color beat display in a media content environment. A media device, operating as a client device, can receive and play media content provided by a media server, or another system or peer device. A user interface enables a user to select from a plurality of displayed media options to be played at the device, wherein each media option corresponds to a media content item, e.g., a song. During the playing of a selected media content, a visual display logic or component determines an audio beat, volume, or other characteristic of the playing media content, and uses this information to modify the visual display at the user interface, to match the audio beat, volume, or other characteristic, for example by synchronizing a variation in color, brightness, scale, transparency, or intensity of a particular region of the visual display.

In accordance with an embodiment, each of the media options is associated with a media content item that is one of a song, music, video, or other type of media content.

In accordance with an embodiment, each particular media option is associated with a particular color, and wherein the use of the audio beat, volume, or other characteristic information to modify a visual display at the user interface, includes synchronizing a variation in color, brightness, scale, transparency, or intensity of a particular region of the visual display associated with a selected media option.

In accordance with an embodiment, as a point of user selection is moved within the plurality of displayed media options, to select different media options, the color or brightness of one or more regions of the visual display is automatically modified to use particular colors associated with the selected media options.

The above and additional embodiments are described in further detail below.

Media Content Environment

Figure 1:
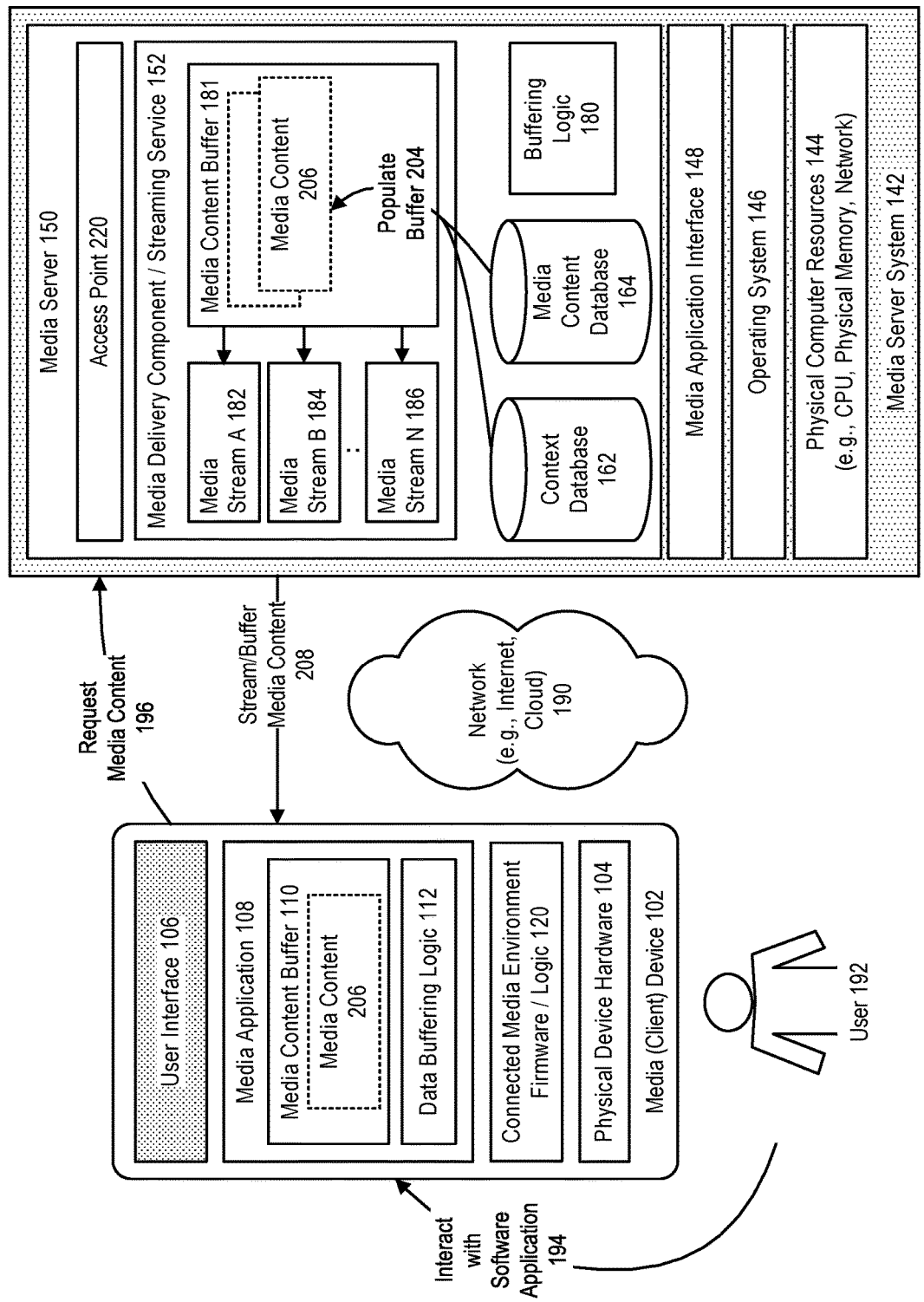
FIG. 1 illustrates an example of a system for providing media content, in accordance with an embodiment.

FIG. 1 illustrates an example of a system for providing media content, in accordance with an embodiment.

As illustrated in FIG. 1, in accordance with an embodiment, a media device 102, operating as a client device, can receive and play media content provided by a backend media server system 142 (media server), or by another system or peer device. In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a software media application 108, together with an in-memory client-side media content buffer 110, and a data buffering logic or component 112, which can be used to control the playback of media content received from the media server, for playing either at a requesting client device (i.e., controlling device) or at a controlled client device (i.e., controlled device), in the manner of a remote control. A connected media environment firmware, logic or component 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment which supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling client device, and their audio speaker as a controlled client device to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination client device to which the media content is being streamed changes, from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media content items.

In accordance with an embodiment, a buffering logic or component 180 can be used to retrieve or otherwise access media content items, in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device, and issue requests to access media content, for example the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content, 206 including one or more streams of media content data, and can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a SPOTIFY™ media content environment, most SPOTIFY™ clients connect to various SPOTIFY™ back-end processes via a SPOTIFY™ "access-point", which forwards client requests to other servers, such as sending one or more metadataproxy requests to one of several metadataproxy machines on behalf of the client or end user.

Figure 2:
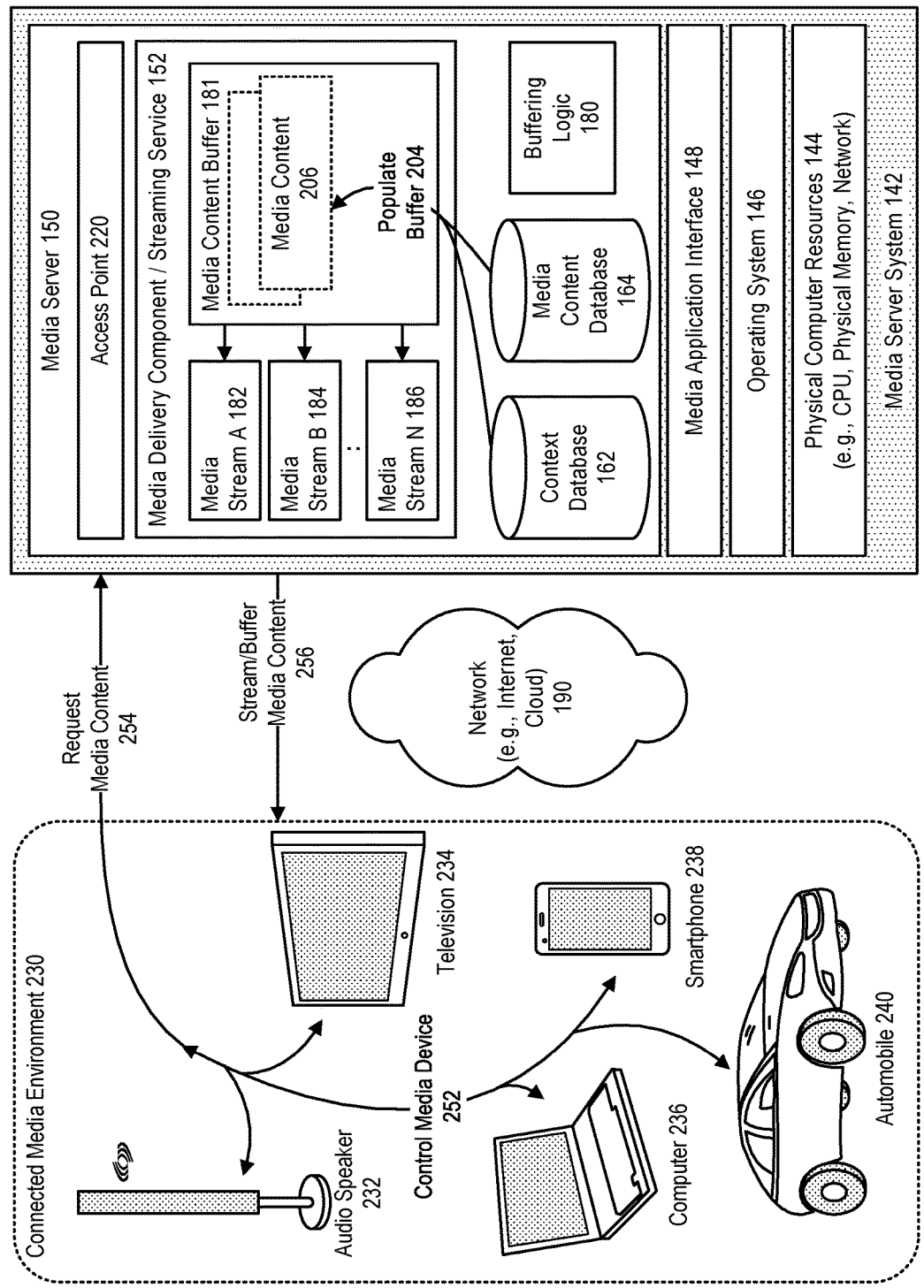
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 230, for example a SPOTIFY™ Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as a firmware logic or component, or within, for example, a separate set-top box or similar aftermarket device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
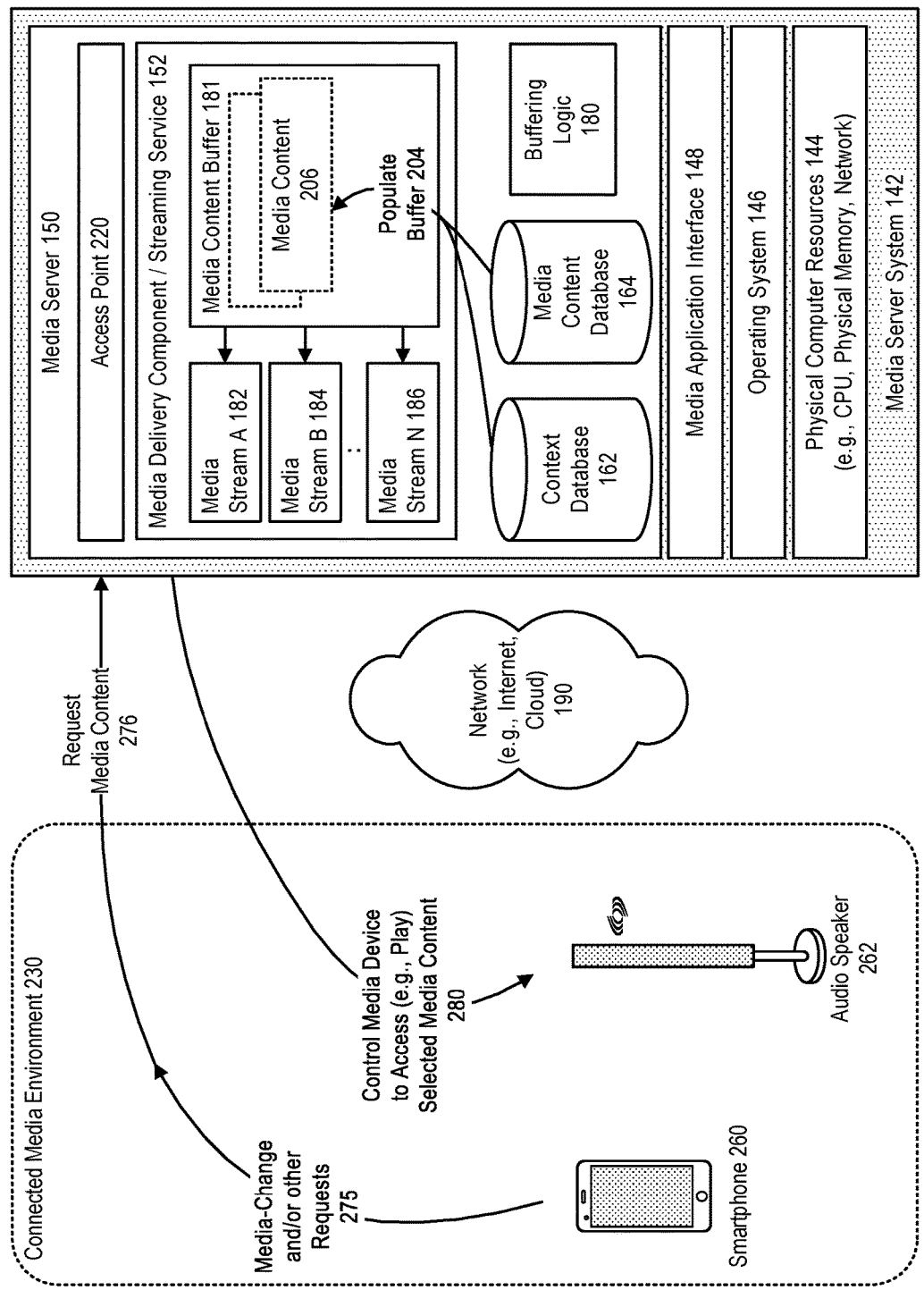
FIG. 3 further illustrates an example of a system for providing media content, in accordance with an embodiment.

FIG. 3 further illustrates an example of a system for providing media content, in accordance with an embodiment.

As illustrated in FIG. 3, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

Color Beat Display

In accordance with an embodiment, during the playing of a selected media content, a visual display logic or component determines an audio beat, volume, or other characteristic of the playing media content, and uses this information to modify the visual display at the user interface, to match the audio beat, volume, or other characteristic, for example by synchronizing a variation in color, brightness, scale, transparency, or intensity of a particular region of the visual display.

Figure 4:
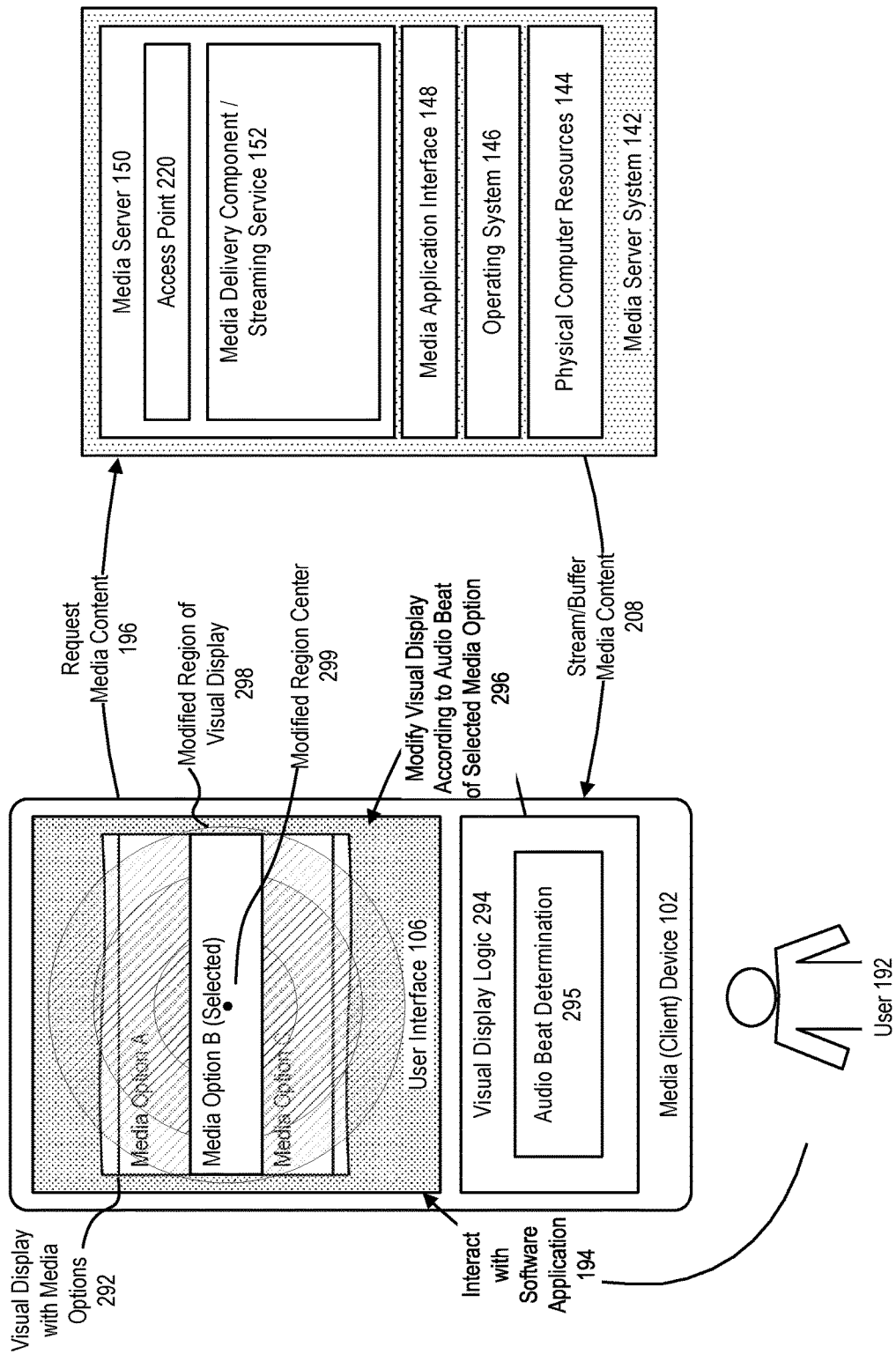
FIG. 4 illustrates a system for color beat display in a media content environment, in accordance with an embodiment.

FIG. 4 illustrates a system for color beat display in a media content environment, in accordance with an embodiment.

As illustrated in FIG. 4, in accordance with an embodiment, a user interface provided at the media device enables a user to select from a plurality of displayed media options 292 to be played at the device, here indicated as media options A, B, and C, wherein each media option corresponds to a media content item.

In accordance with an embodiment, a visual display logic or component 294, for example within or provided by the software media application, is configured to determine 295 an audio beat, volume, or other characteristic of the playing media content, and use this information to modify 296 the visual display at the user interface, to match the audio beat, volume, or other characteristic of the playing media content.

In accordance with an embodiment, a modified region of the visual display 298 can be provided in the form of a generally circular shape of varying color, brightness, or intensity, and associated with a selected media option, for example by having its center 299 located at or in proximity to the selected media option, with the modified region of the visual display displayed generally behind the selected media option.

In accordance with an embodiment, each of the media options is associated with a media content item that is one of a song, music, video, or other type of media content.

In accordance with an embodiment, each particular media option is associated with a particular color, and wherein the use of the audio beat, volume, or other characteristic information to modify a visual display at the user interface, includes synchronizing a variation in color, brightness, scale, transparency, or intensity of a particular region of the visual display associated with a selected media option.

Figure 5:
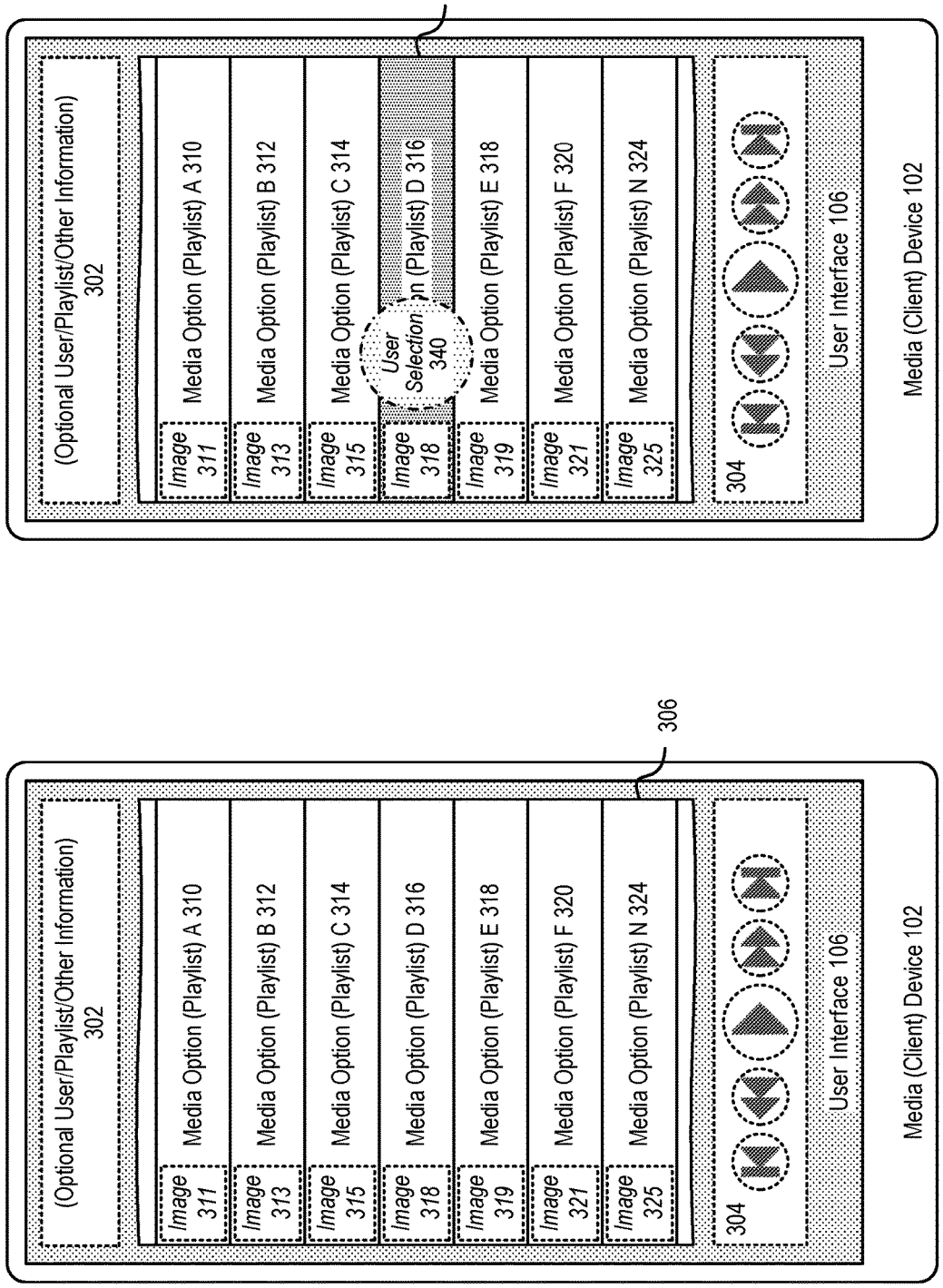
FIG. 5 further illustrates a system for color beat display in a media content environment, in accordance with an embodiment.

FIG. 5 further illustrates a system for color beat display in a media content environment, in accordance with an embodiment.

As illustrated in FIG. 5, in an exemplary embodiment, the user interface can include a visual display with optional user, playlist, or other information 302, a media playback control 304, and a plurality of media options 306 (e.g., songs, music, videos, or playlists of media content items). For example, the plurality of media options can include media options (playlists) A 310, B 312, C 314, D 316, E 318, F 320, and N 324. Optionally, each media option can be associated with an image 311, 313, 315, 318, 319, 321, and 325 respectively, which can be, for example, a music album cover art or other image representative of that media option.

As further illustrated in FIG. 5, a user can make a selection 340 of a selected media option 342, which in this example may be media option (playlist) D.

Figure 6:
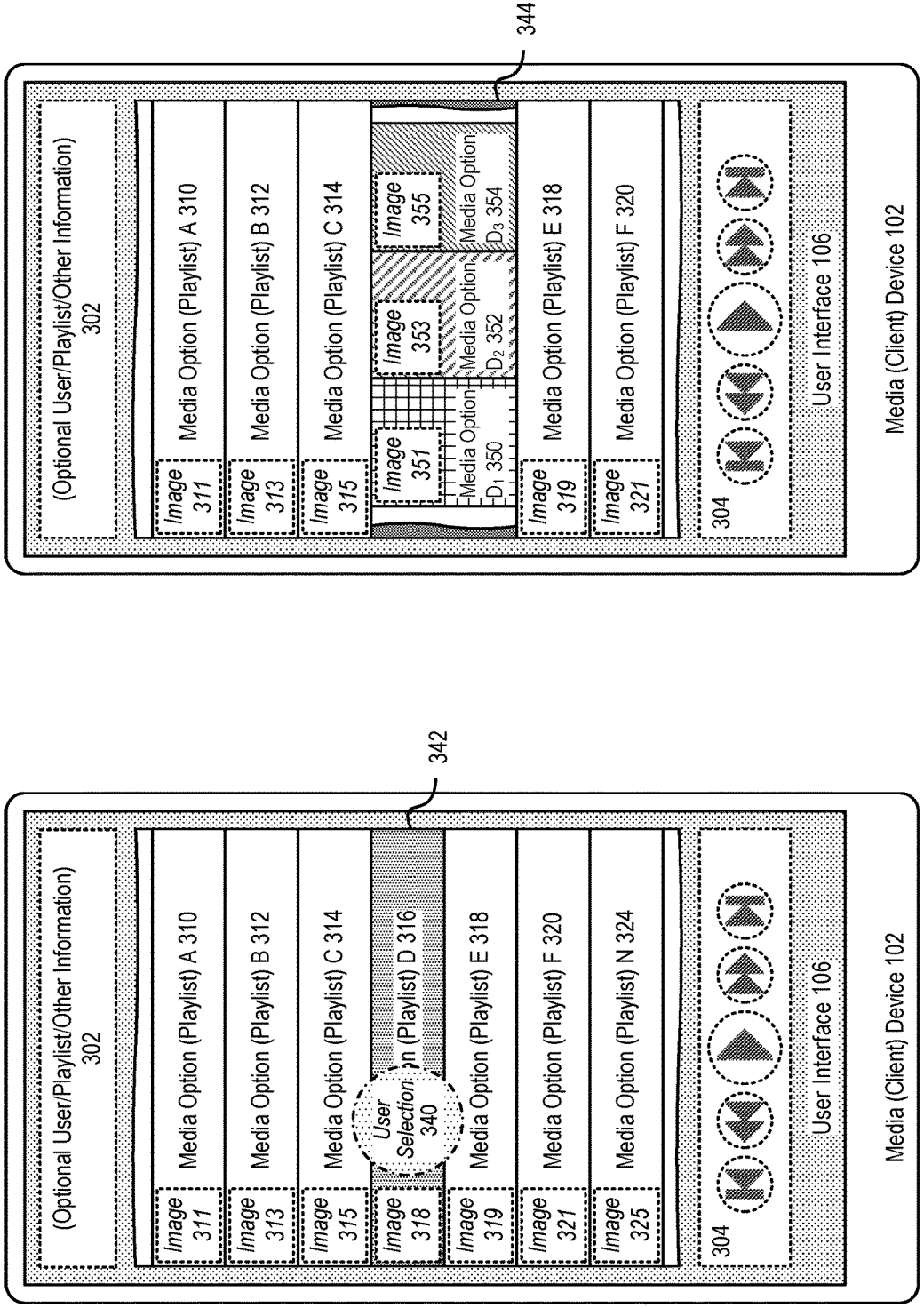
FIG. 6 further illustrates a system for color beat display in a media content environment, in accordance with an embodiment.

FIG. 6 further illustrates a system for color beat display in a media content environment, in accordance with an embodiment.

As illustrated in FIG. 6, in an exemplary embodiment, upon selection of the selected media option, in this example media option (playlist) D, a plurality of additional media options 344, that are associated with the selected media option, can be displayed on the user interface. For example, the media option (playlist) D may include a plurality of songs, music, or videos contained within a playlist, which themselves are associated with media options $D_1$ 350, $D_2$ 352, and $D_3$ 354, and can be displayed on the user interface.

Optionally, each of these media options can be likewise associated with an image 351, 353 and 355 respectively, which can similarly be, for example, a music album cover art or other image representative of that media option.

Figure 7:
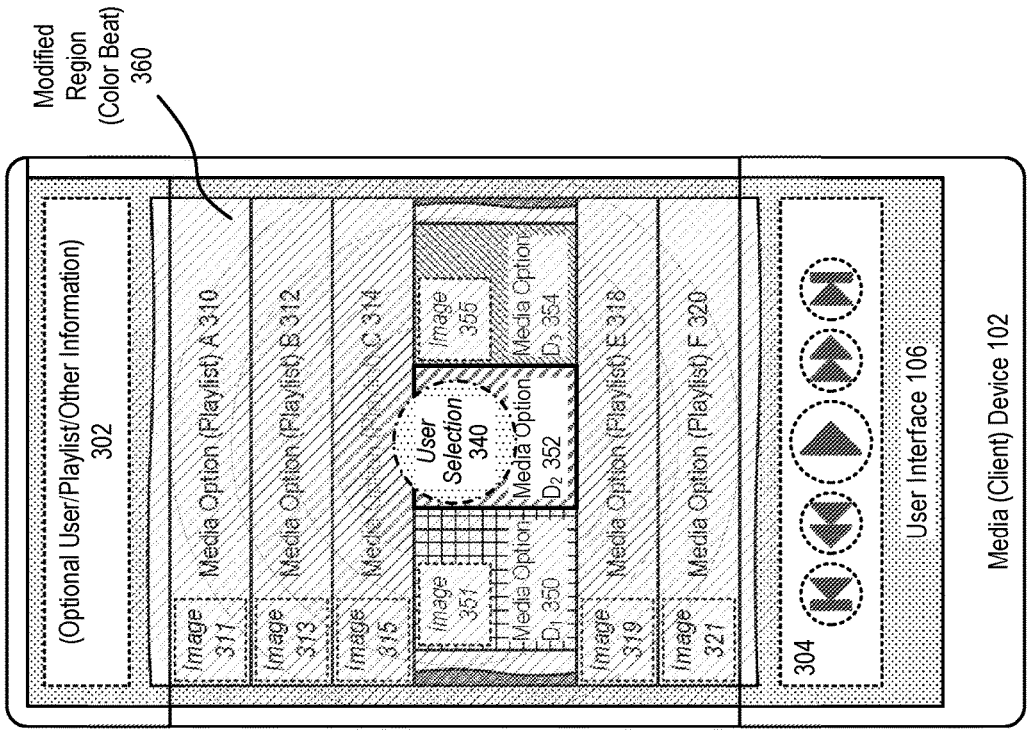
FIG. 7 further illustrates a system for color beat display in a media content environment, in accordance with an embodiment.
Figure 7:
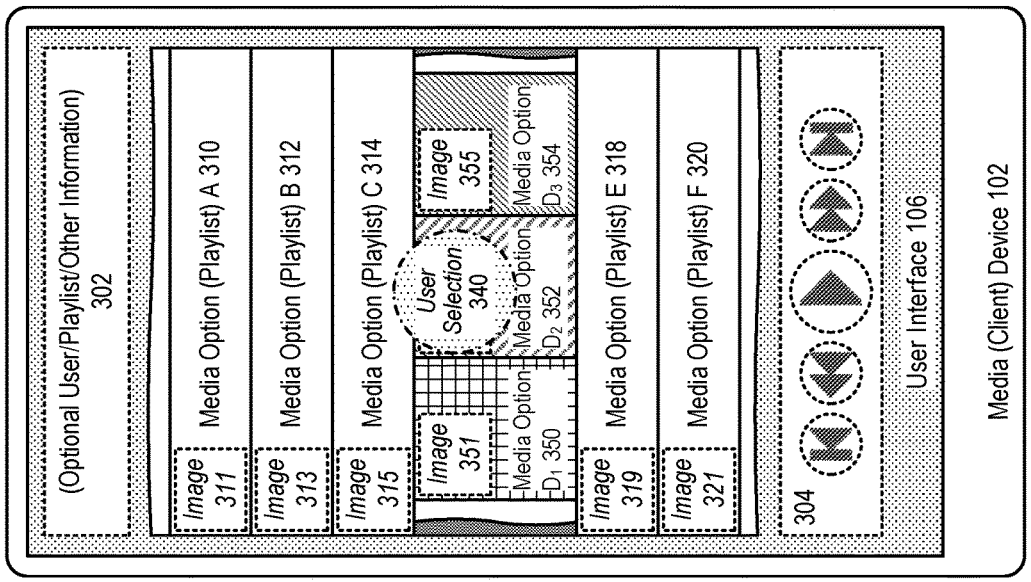

FIG. 7 further illustrates a system for color beat display in a media content environment, in accordance with an embodiment.

As illustrated in FIG. 7, in an exemplary embodiment, a user can continue to make a selection of a selected media option, which in this example may be the song, music, or video $D_2$, upon which selection the corresponding song, music, or video can be played at the media device.

As further illustrated in FIG. 7, while the selected song, music, or video is being played at the media device, an audio beat, volume, or other characteristic of the playing media content is determined, and is used to modify the visual display at the user interface, to match the audio beat, volume, or other characteristic of the playing media content.

For example, a modified region (color beat) 360 of the visual display can be provided in the form of a generally circular shape of varying color, brightness, or intensity, and associated with selected media option $D_2$, for example by having its center located at or in proximity to media option $D_2$, with the modified region of the visual display displayed generally behind the selected media option.

In accordance with an embodiment, the color chosen for the modified region (color beat) can be generally taken from, or otherwise based on, the optional image, e.g., music album cover art or other representative image representative, of the selected and currently playing media option.

In accordance with various embodiments, neighboring (but not currently selected) media options may be either partially obscured by the modified region (color beat) associated with the selected media option, or alternatively the modified region of the visual display can be displayed generally behind both the selected media option, and one or more neighboring media options, for example $D_1$ and $D_3$, to improve the visibility and user experience in browsing between, for example, the set of media options $D_1$, $D_2$ and $D_3$. A similar technique can be applied to browsing between one or more neighboring media options (playlists).

In accordance with an embodiment, each particular media option is associated with a particular color, and wherein the use of the audio beat, volume, or other characteristic information to modify a visual display at the user interface, includes synchronizing a variation in color, brightness, scale, transparency, or intensity of a particular region of the visual display associated with a selected media option.

Figure 8:
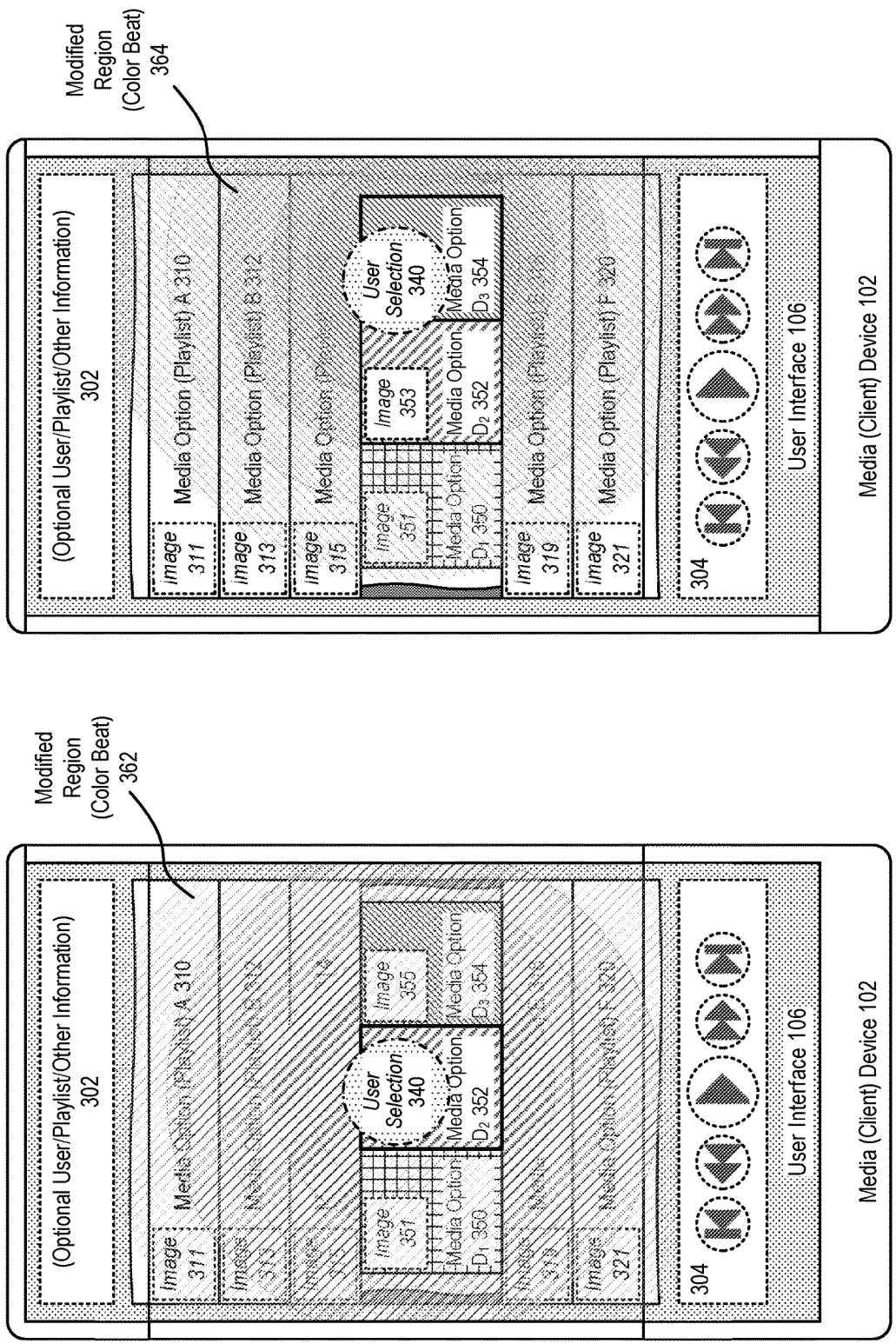
FIG. 8 further illustrates a system for color beat display in a media content environment, in accordance with an embodiment.

FIG. 8 further illustrates a system for color beat display in a media content environment, in accordance with an embodiment.

As illustrated in FIG. 8, in an exemplary embodiment, while the selected song, music, or video is being played at the media device, the audio beat, volume, or other characteristic of the playing media content is used to control the modified region (color beat) 362 to match the audio beat, volume, or other characteristic of the playing media content, for example by synchronizing a variation in color, brightness, scale, transparency, or intensity of a particular region, which appears as a pulsating color effect.

As further illustrated in FIG. 8, as a point of user selection is moved within the plurality of displayed media options, to select different media options, the color or brightness of one or more regions of the visual display is automatically modified 364 to use particular colors associated with the selected media options, for example as taken from their optional music album cover art or other representative image.

In accordance with various embodiments, the systems and methods described herein can also be used in combination with systems and methods that support multi-track playback of media content and include the ability to adjust playback parameters for various media content items, such as their relative playback volumes, by crossfading or otherwise combining playback to reflect each media option's relative distance from a selected point or region, as described, for example, in co-pending application "SYSTEM AND METHOD FOR MULTI-TRACK PLAYBACK OF MEDIA CONTENT", application Ser. No. 14/228,605, filed Mar. 28, 2014, which is herein incorporated by reference.

Figure 9:
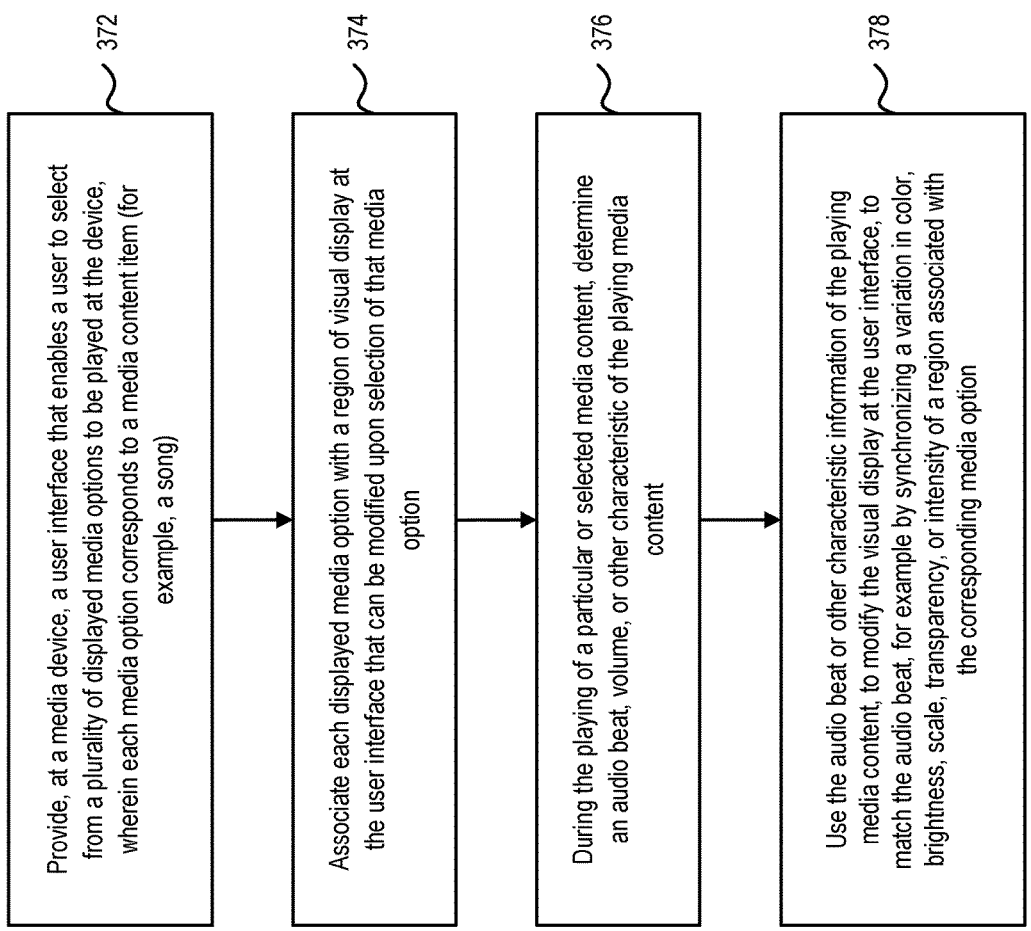
FIG. 9 illustrates a method for color beat display in a media content environment, in accordance with an embodiment.

FIG. 9 illustrates a method for color beat display in a media content environment, in accordance with an embodiment.

As illustrated in FIG. 9, at step 372, a user interface is provided at a media device, that enables a user to select from a plurality of displayed media options to be played at the device, wherein each media option corresponds to a media content item (for example, a song).

At step 374, each displayed media option is associated with a region of visual display at the user interface that can be modified upon selection of that media option.

At step 376, during the playing of a selected media content, an audio beat, volume, or other characteristic of the playing media content is determined.

At step 378, the audio beat, volume, or other characteristic information of the playing media content is used to modify the visual display at the user interface, to match the audio beat, for example by synchronizing a variation in color, brightness, scale, transparency, or intensity of a region associated with the corresponding media option.

Embodiments of the present invention may be conveniently implemented using one or more conventional general purpose or specialized digital computer, computing device, server, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate exemplary uses in media content environments, or music streaming services such as SPOTIFY™, for use in providing streamed music or other media content, the systems and techniques described herein can be similarly used with other types of systems, and/or for providing other types of data.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for color beat display in a media content environment, for use by a device that includes a processor and that receives and plays media content provided by a media server or by another system or peer device, the method comprising:
providing a user interface comprising a visual display, that displays a plurality of displayed media options and is configured to receive a selection of a first displayed media option from within the plurality of displayed media options,
   wherein each of the displayed media options is associated with one or more media content items to be played at the media device, and a particular color, and
   in response to receiving a user selection indicative of selecting the first displayed media option,
      determining one or more media content items and a particular color associated with the first displayed media option,
      while playing the one or more media content items associated with the first displayed media option, determining an audio beat, volume, or other characteristic of the playing media content, and
      modifying, as a modified region, a particular region of the visual display associated with the selected media option, in accordance with the particular color associated with the first displayed media option, to match the audio beat, volume, or other characteristic of the playing media content, including
      synchronizing a variation in color, brightness, scale, transparency, or intensity of the modified region with a particular color associated with the selected media option,
   in response to receiving a user selection indicative of moving between the first displayed media option and a second displayed media option within the plurality of displayed media options,
      determining one or more media content items and a particular color associated with the second displayed media option,
      adjusting playback from the one or more media content items associated with the first displayed media option, to the one or more media content items associated with the second displayed media option,
      while playing the one or more media content items associated with the second displayed media option, determining an audio beat, volume, or other characteristic of the playing media content, and
      modifying the modified region in accordance with the particular color associated with the second displayed media option, to match the audio beat, volume, or other characteristic of the playing media content, including
      synchronizing a variation in color, brightness, scale, transparency, or intensity of the modified region.

2. The method of claim 1, wherein each of the media options is associated with a media content item that is one of a song, music, video, or other type of media content.

3. The method of claim 1, wherein the selected media option is associated with an image, and a particular color of the modified region is taken from or otherwise based on the image.

4. A system for color beat display in a media content environment, comprising:
a media device, that operates as a client device and includes a processor, and that can receive and play media content provided by a media server, or another system or peer device; and
a user interface comprising a visual display provided at the media device, that displays a plurality of displayed media options and is configured to receive a selection of a first displayed media option from within the plurality of displayed media options,
   wherein each of the displayed options is associated with one or more media content items to be played at the media device, and a particular color, and
wherein the media device is configured to:
   in response to receiving a user selection indicative of selecting the first displayed media option,
      determine one or more media content items and a particular color associated with the first displayed media option,
      while playing the one or more media content items associated with the first displayed media option, determine an audio beat, volume, or other characteristic of the playing media content, and
      modify, as a modified region, a particular region of the visual display associated with the first displayed media option, in accordance with the particular color associated with the first displayed media option, to match the audio beat, volume, or other characteristic of the playing media content, including
      synchronizing a variation in color, brightness, scale, transparency, or intensity of the modified region, in response to receiving a user selection indicative of moving between the first displayed media option and a second displayed media option within the plurality of displayed media options,
- determine one or more media content items and a particular color associated with the second displayed media option,
- adjust playback from the one or more media content items associated with the first displayed media option, to the one or more media content items associated with the second displayed media option,
- while playing the one or more media content items associated with the second displayed media option, determine an audio beat, volume, or other characteristic of the playing media content, and
- modify the modified region in accordance with the particular color associated with the second displayed media option, to match the audio beat, volume, or other characteristic of the playing media content, including
  - synchronizing a variation in color, brightness, scale, transparency, or intensity of the modified region.

5. The system of claim 4, wherein each of the media options is associated with a media content item that is one of a song, music, video, or other type of media content.

6. The system of claim 4, wherein the selected media option is associated with an image, and a particular color of the modified region is taken from or otherwise based on the image.

7. The system of claim 4, wherein the modified region is in form of a circular shape of varying color, brightness, or intensity.

8. The system of claim 4, wherein the modified region is associated with the selected media option by having its center at or in proximity to the selected media option.

9. The system of claim 8, wherein as a point of user selection is moved within the plurality of displayed media options, to select different media options, the center of the modified region is moved in accordance therewith.

10. The system of claim 4, wherein the modified region is displayed behind a selected media option.

11. The system of claim 4, wherein one or more neighboring unselected media options are partially obscured by the modified region.

12. The system of claim 4, wherein the modified region is displayed behind the selected media option and one or more neighboring unselected media options.

13. The system of claim 4, wherein the adjusting playback comprises crossfading or otherwise combining audio of the one or more media content items associated with the first displayed media option, with audio of the one or more media content items associated with the second displayed media option.

14. A non-transitory computer readable storage medium, including instructions stored thereon which when read and executed by a device that includes a processor and that receives and plays media content provided by a media server or by another system or peer device, causes the device to perform a method comprising:

providing a user interface comprising a visual display, that displays a plurality of displayed media options and is configured to receive a selection of a first displayed media option from within the plurality of displayed media options,
- wherein each of the displayed media options is associated with one or more media content items to be played at the media device, and a particular color, and in response to receiving a user selection indicative of selecting the first displayed media option,
- determining one or more media content items and a particular color associated with the first displayed media option,
- while playing the one or more media content items associated with the first displayed media option, determining an audio beat, volume, or other characteristic of the playing media content, and
- modifying, as a modified region, a particular region of the visual display associated with the selected media option, in accordance with the particular color associated with the first displayed media option, to match the audio beat, volume, or other characteristic of the playing media content, including
  - synchronizing a variation in color, brightness, scale, transparency, or intensity of the modified region with a particular color associated with the selected media option, in response to receiving a user selection indicative of moving between the first displayed media option and a second displayed media option within the plurality of displayed media options,
- determining one or more media content items and a particular color associated with the second displayed media option,
- adjusting playback from the one or more media content items associated with the first displayed media option, to the one or more media content items associated with the second displayed media option,
- while playing the one or more media content items associated with the second displayed media option, determining an audio beat, volume, or other characteristic of the playing media content, and
- modifying the modified region in accordance with the particular color associated with the second displayed media option, to match the audio beat, volume, or other characteristic of the playing media content, including
  - synchronizing a variation in color, brightness, scale, transparency, or intensity of the modified region.

15. The non-transitory computer readable storage medium of claim 14, wherein each of the media options is associated with a media content item that is one of a song, music, video, or other type of media content.

16. The non-transitory computer readable storage medium of claim 14, wherein the selected media option is associated with an image, and a particular color of the modified region is taken from or otherwise based on the image.

* * * * *